United States Patent [19]

Mitchell

[11] 4,455,517

[45] Jun. 19, 1984

[54] DOOR ACTIVATING CONTROL CIRCUITRY

[76] Inventor: Donald A. Mitchell, R.R. 2, 17A Robin Hill Apts., Hampton, N.J. 08827

[21] Appl. No.: 424,470

[22] Filed: Sep. 27, 1982

[51] Int. Cl.[3] .................................... H02P 1/08

[52] U.S. Cl. .................................... 318/283; 318/267; 318/266; 318/282; 318/467; 318/464; 318/466; 318/484; 318/487

[58] Field of Search ............... 318/266, 281, 282, 283, 318/445, 261, 443, 463, 284, 285, 286, 466, 467, 484, 487, 267

[56] References Cited

U.S. PATENT DOCUMENTS

| | | | |
|---|---|---|---|
| 3,230,435 | 1/1966 | Andrews | 318/284 |
| 3,383,577 | 5/1968 | Ellmore | 318/266 X |
| 3,436,598 | 4/1969 | Guerrisi | 318/281 X |
| 4,134,050 | 1/1979 | Sibalis | 318/267 |
| 4,134,051 | 1/1979 | Pelchat et al. | 318/282 |
| 4,191,915 | 3/1980 | Johansson | 318/464 |
| 4,247,806 | 1/1981 | Mercier | 318/467 X |
| 4,364,003 | 12/1982 | Phipps | 318/266 X |

*Primary Examiner*—B. Dobeck
*Assistant Examiner*—Paul Shik Luen

[57] ABSTRACT

An improvement in door activating control apparatus including a short delay between the time the door is stopped during its closing direction of travel and starts moving in the opening direction when any one of any switch or button for opening the door is activated, prevents the stress incurred when the door is required to instantly reverse its direction of travel while closing, demonstrates a distinct advantage especially when controlling large heavy doors, or for door openings that require a high volume of traffic and in emergency situations, includes a means to by-pass the delayed reversing when the door is in the closed position. Features a novel means of using a single pole double throw switch which will serve to defeat a safety edge device and by-pass the delayed reversing, embodied in a single enclosure along with the door closing limit switch, all actuated by a single mechanical actuating device at the door closed position, demonstrates distinct advantages in door operator design. Included in the circuit is an improved means to raise the door to a partial open position from a single momentarily actuated button, does not require a partial open limit switch and the height of the partial open position can be easily changed in the field. The improved circuit also provides door opening and closing pilot relays, eliminating the need for motor reversing contactors along with mechanical interlocks and self latching contacts, exhibits significant optional advantages in the selection of motor controlling relays.

4 Claims, 2 Drawing Figures

DOOR ACTIVATING CONTROL CIRCUITRY

DISCLOSURE OF INVENTION

Figure 1:
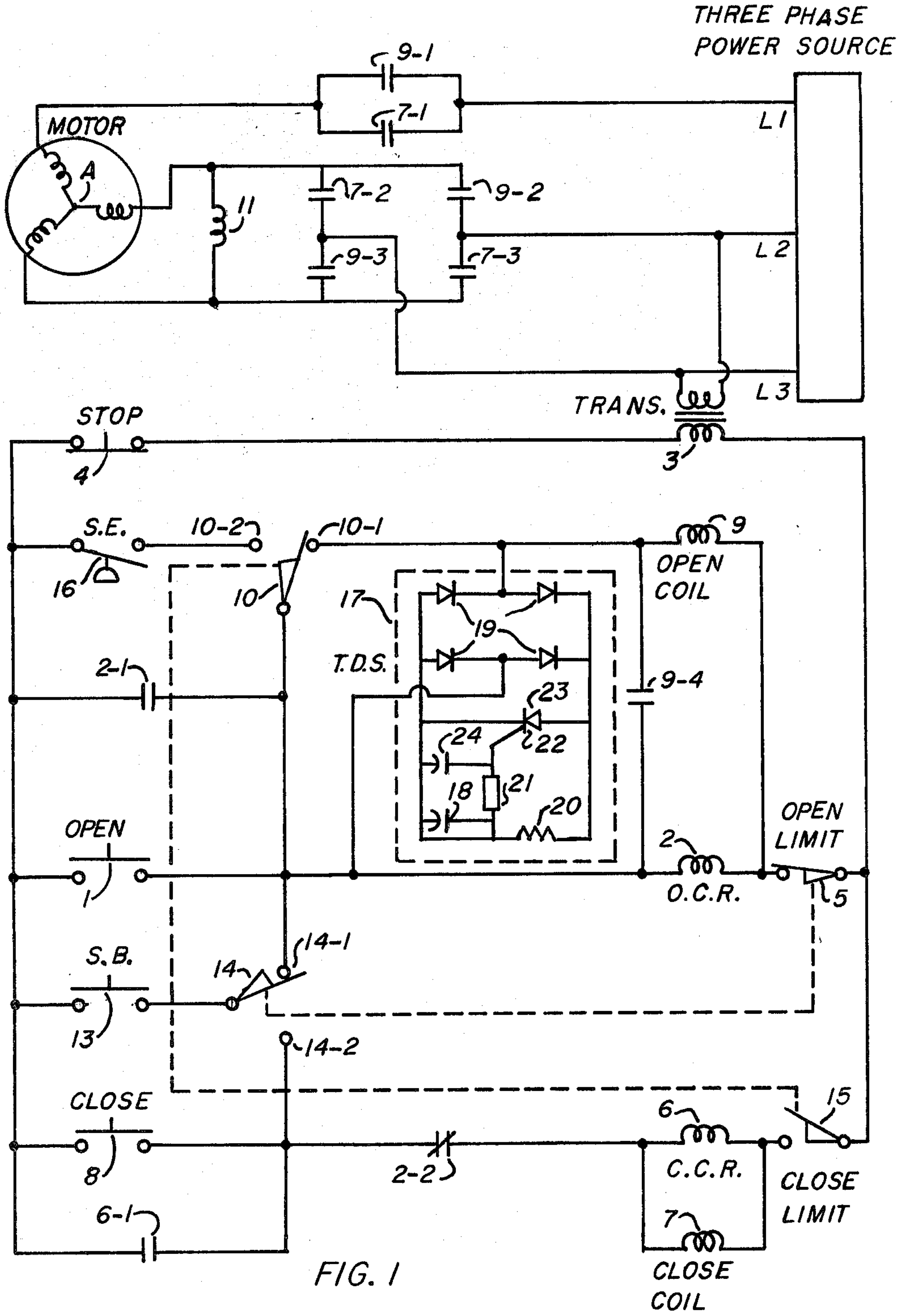

This invention relates to improvements in electrical control apparatus and more specifically to improved circuitry for the opening and closing of doors and the like and more particularly, improved means of reversing the doors direction of travel while closing and to obtain a partial open position from a single momentarily actuated push button or switch.

The most common means for controlling an electrically operated door, due to its selectivity of control, is the three button control station wherein open, close and stop buttons are embodied in a single enclosure and a momentary impulse from the appropriate button will activate the door, however, it is often necessary to reverse the doors direction of travel during its closing direction of travel from a single normally open button or switch in an emergency situation or as a convenience, i.e. to speed the flow of traffic through the opening. This requires that a single electrical impulse will de-activate the closing direction windings of the motor and activate the opening direction windings of the motor. This instant change in the direction of travel of the door, which can exceed several thousand pounds in weight, will severely stress the mechanical and/or electrical apparatus controlling the movement of the door resulting in excessive maintainance and possible damage, i.e. slacking of the door lifting cables causing them to jump off the cable drums.

Prior motor control arrangements to overcome these objections and disadvantages have been to use the centrifugal switch and starting winding of the single phase induction motor as a means of providing an electrical path to prevent the reversing circuit from becoming energized until after the motor has reduced its speed sufficiently to close the centrifugal switch and energize the reversing circuit, the objection to this method is that its use is limited to the single phase induction motor which is not suitable for the larger industrial type doors which usually require instant reverse type motors. Another means is to introduce a delay period in the circuit between stopping the motor in the door closing direction and starting the motor in the door opening direction. The objection to this arrangement has been that the delay is present when the door is at rest and in the fully closed position and the door will not respond immediately when a door opening switch is activated, causing the person operating the door considerable confusion, i.e. when entering or exiting over a driveway treadle to open the door and it is not normally required to slow or stop the vehicle before passing through the opening.

With respect to the door closing direction, door controlling embodiments have employed what is known as a pnuematic safety edge switch which is a normally open contact pair having a sensing element located along the bottom edge of the door, such that the contacts clsoe when the door strikes an obstruction in its path towards the closing position. The safety edge may comprise, for example, an inflated pneumatic tube secured along the bottom edge of the door coupled to a pressure sensitive switch. The pressure sensitive switch, well known to those skilled in the state of the art, may comprise a diaphram which when extended by a pressure impulse from the tube, forces the two electrical contacts together, thus when an obstruction is engaged, the pressure is increased on one side of the diaphram closing the switch contacts which will instantly transfer electrical energy from the closing direction relay coil to the opening direction relay coil via the door opening control circuitry. The pneumatic safety edge is the most commonly used because of its low initial cost, however, there is an inherent disadvantage when using this type of safety edge when a delay is placed in the reversing circuit between the closing and opening relay coils wherein the air displaced in the air tube will not retain the contact closure for the length of time required to reverse the direction of the door due to an almost immediate loss of sufficient pressure in the tube to maintain contact closure after the door is stopped.

Again in reference to the three button station, control circuitry is generally arranged such as when the door is closing and the button marked open is depressed, there will be no effect in the doors direction of travel. In an emergency situation when the door strikes or is about to strike an obstruction, the person operating the door from the multiple push button station will almost instinctively reach for and depress the button marked open with the intent of reversing the doors direction of travel, however as has been noted, this will have no effect and the door will attempt to continue to travel in the closing direction. The time expended due to that action along with the resulting confusion, could cause damage or injury to the object or person in the path of the door.

Finally, in respect to a partial open position of the door wherein it is often expedient and economical to have the door stop in a partial open position in order to allow the passage of small moving vehicles through the opening then return the door to the closed position. Prior means to accomplish this has been with the addition of a partial open limit switch which is generally fastened to the door track and in most cases requires an improvised means to actuate the switch. The objection to this method is the time involved on the job site, along with the difficulty in changing the partial open position if required.

With the foregoing in view, a primary object of the invention is to provide in door controlling apparatus a means to delay the reversal of the door from any normally open button, or switch, which is intended to open the door between the time the motor stops rotating in the door closing direction and starts rotating in the door opening direction.

A second object is to include, in the control circuit, a means of retaining a momentary electrical impulse, from any door opening button, or switch, after that button, or switch, has lost its electrical continuity.

A third object is to provide, in the construction of the door operator, a single pole double throw switch which will function as a safety edge defeat switch and a time delay by-pass switch activated at the door closed position by the door close limit switch actuator.

A fourth object is improved circuitry for stopping the door in a partial open position from an impulse at a normally open button or switch, eliminating the need of a partial open limit switch and to simplify changing the part open position when necessary.

A final object of this invention is to provide door opening and closing pilot relays to replace the mechanical and electrical interlocks embodied in the motor reversing contactor.

These and other objects of the invention are achieved by means of circuitry which includes time delay devices, preferably of the AC solid state type switch and a safety edge defeat switch, a time delay by-pass switch and a close direction limit switch all embodied in a single enclosure activated from a single switch actuator at the door closing limit of travel.

Figure 2:
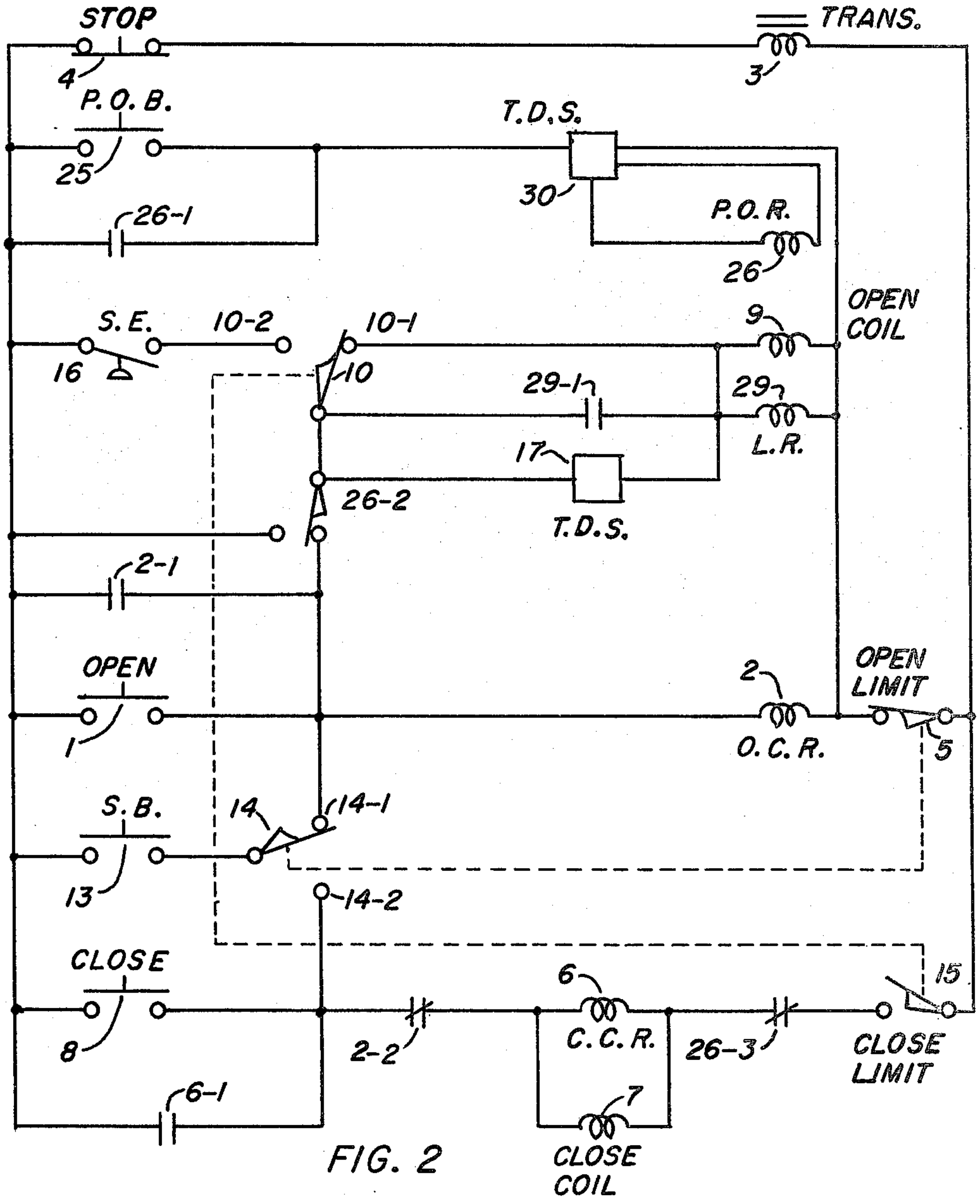

More specifically the manner of achieving the objects of the invention will become apparent from the following detailed description of the illustrative embodiments of the invention and from the accompanying schematic drawings FIG. 1 and FIG. 2 which are the preferred form of the invention and depict the motor de-energized with the door at rest in the fully closed position.

Now referring to FIG. 1, momentary closure of door opening button 1 will energize door opening control relay coil 2 via the power source, secondary winding 3 of the transformer, stop button 4, the now closed open direction button 1 and the normally closed open direction limit switch 5. Open direction relay coil 9 will become energized at the same time via the same electrical path, but including first transfer switch common member 10 now held closed terminal 10-1. Door opening control relay 2 first set of normally open self latching contacts 2-1 will close, latching into an energized state open direction relay coil 9 and open control relay 2. Door opening control relay 2 second set of normally closed contacts 2-2 will open to prevent door closing control relay 6 and door closing relay coil 7 from becoming energized if close direction button 8 is depressed when the door is opening. Door open direction relay 9 contacts 9-1, 9-2 & 9-3 will close energizing motor windings A to start the door in its opening direction and brake solenoid coil 11 to free the motor shaft to rotate in the door opening direction via the power source. Open direction relay 9 self latching contacts 9-4 will close latching into an energized state open direction coil 9. As the door starts moving in the open direction close limit switch 15, now held open contacts, will close and first transfer switch common member 10 will open its now held closed time delay by-pass terminals 10-1 and close its safety edge defeat terminals 10-2. The door will continue to travel towards the open position unless stop button 4 is depressed disconnecting the motor and control circuit from the power source. When the door reaches its near open limit of travel second transfer switch common member 14 will open its door opening terminal 14-1 and close its door closing terminal 14-2 then open direction limit switch 5 will open its contacts disconnecting open direction relay coil 9 and open control relay coil 2 from the secondary winding 3 of the transformer and the power source. Open control relay 2 contacts 2-1 will open, contacts 2-2 will close and door opening relay 9 contacts 9-1, 9-2, 9-3 & 9-4 will open disconnecting motor windings A and brake solenoid coil 11 from the power source stopping the motor and re-setting the brake in the door open position.

As in the foregoing paragraph and with careful examination of the circuitry, as shown in FIG. 1, it should become apparent that by depressing single button 13 the door will function in the same manner as when depressing open direction button 1 but via the normally closed second transfer switch common member 14 terminal 14-1 and then following the same electrical path taken when door opening button 1 is depressed.

Correspondingly in an analogous mode of operation, depressing the close direction button 8 will activate close direction control relay coil 6 and close direction relay coil 7 via the secondary winding 3 of the transformer, stop button 4, now activated close button 8, open control relay 2 contacts 2-2 and close limit switch contacts 15. close direction control relay 6 will close its self latching contacts 6-1 and close direction relay 7 will close its door closing contacts 7-1, 7-2 & 7-3 energizing motor windings A along with brake solenoid coil 11 and the door will start moving in its closing direction. Open limit switch 5 will close its contacts then second transfer switch common member 14 will move from its door closing terminal 14-2 to its door opening terminal 14-1 and the door will continue moving in the close direction, unless the power source is interrupted by depressing stop button 4 or if any door opening button or switch is activated, which function will be explained in more detail in the following paragraphs. When the door reaches its near closed position first transfer switch common member 10 will open its safety edge defeat terminal 10-2 and close its time delay by-pass terminal 10-1, which function will also be explained in the following paragraph, then close limit switch 15 will open de-energizing both door closing control relay coil 6 and door closing relay coil 7. Self latching contacts 6-1 and door closing contacts 7-1, 7-2, & 7-3 will open disconnecting motor windings A and brake solenoid 11 from the power source, re-setting the brake and stopping the door in the closed position. Again upon careful examination of FIG. 1, depressing single button 13 will function in the same manner as when depressing close button 8, but via the held closed second transfer switch common member 14 terminal 14-2.

Referring once more to the door closing mode and FIG. 1. When the door is traveling towards its closed position and safety edge sensor switch 16 is activated, open control relay coil 2 will become energized via transformer secondary winding 3, stop button 4, now activated safety edge sensor switch 16 and open direction limit switch 5. Open direction control relay 2, self latching contacts 2-2 will close locking said relay coil into an energized state, contacts 2-1 will open de-energizing close direction control relay coil 6 and door closing relay coil 7 and again, as in the preceding paragraph, disconnect the motor from the power source and stop the downward movement of the door. Off-on, series connected, AC time delay switch 17 timing capacitor 18 will begin to charge via transformer secondary winding 3, stop button 4, door opening control relay 2 contacts 2-1, rectifier bridge 19, charging resistor 20, open direction relay coil 9 and now closed open direction limit switch 5. When voltage across timing capacitor 18 reaches threshold voltage at zener diode 21, timing capacitor 18 will discharge and a pulse will be produced at silicon control rectifier gate 22, thus turning SCR 23 ON, or in its conductive state. Once the SCR is turned ON it is kept in the ON state by means of latching capacitor 24. The combination of SCR 23 and rectifier bridge 19 provides a solid state AC switch, which when in the ON state will energize door opening coil 9. At the expiration of the pre-set timing period, of about 1 second, contacts 9-1, 9-2 & 9-3 will close energizing the door opening windings A of the motor and brake solenoid coil 11, removing the door from the obstruction and returning it to the full open position, following the same sequence of operation as described in the door opening mode, with the exception that time delay switch 17 will return to its OFF, or non-conductive state, when open direction limit switch 5 opens its contacts and disconnects it from the power source.

As in the preceding paragraph, when the door is travelling towards the closed position, single button 13 now connected in parallel with safety edge sensor switch 16 via second transfer switch common member 14 contact 14-1 and open button 1 will both function in the same manner as safety edge sensor switch 16, when activated.

It should be noted that open direction relay 9 self latching contacts 9-4 are not required except when the door is opened from its fully closed position when contacts 10-1 short circuit time delay switch 17 preventing said switch from turning to the ON state, as has been explained in the door opening mode of operation. Further in respect to transfer switch means, open direction limit switch 5 and second transfer switch common member 14 are preferably mechanically interlocked and actuated by a single cam or gear device at the door open position, as are close direction limit switch 15 and first transfer switch common member 10, which are actuated at the door close position. The advantage in using this arrangement is that it is not practical, from a design standpoint, to have more than one switch actuating device at the door limits of travel and the double pole double throw Micro Switch, well known to those skilled in the art, is well adapted for this purpose and it can, dependably, be adjusted to have the first set of contacts actuate before the second set of contacts assuring that, for instance, safety edge defeat contacts 10-2 will open and time delay by-pass contacts 10-1 will close before close limit switch 15 opens its contacts and stops the door in the fully closed position.

FIG. 2 discloses an alternate embodiment of the invention, wherein self latching contacts 9-4 FIG. 1, an embodiment of door opening relay 9, is replaced in FIG. 2 with latching relay coil 29 connected in parallel with open coil 9 and its self latching contacts 29-1 are connected in parallel with first transfer switch normally open terminal 10-1.

FIG. 2 also includes in the circuit shown in FIG. 1, a partial open position of the door. Note the location in FIG. 2 of contacts 26-2 and 26-3 which if not activated from partial open button 25 the circuit will function in all respects and in the same manner as that described in the preceding paragraphs and shown in FIG. 1, therefore it will not be necessary to describe the door opening and closing modes of operation in the following paragraphs.

It might be well to note here that time delay switch 17, FIG. 1, is known to those knowledgeable in the state of the art, as delay on make or off-on type and time delay switch 30, FIG. 2, is known as an interval or on-off type. Both are, preferably, of the solid state resistor capacitor configuration.

Now referring to FIG. 2, which shows the circuit de-energized and the door in the fully closed position, momentary closure of partial open button 25 will immediatly energize partial open relay coil 26 and start charging on-off time delay switch 30 via secondary winding 3 of the transformer, normally closed stop button 4, now activated partial open button 25 and open direction limit switch 5. Partial open relay 26 first set of normally open contacts 26-1 will close latching into an energized state both partial open relay coil 26 and time delay switch 30. Partial open relay 26 second set of single pole double throw contacts will transfer energizing door opening coil 9 and latching relay coil 29 via secondary winding 3 of the transformer, stop button 4, now closed normally open contacts 26-2, first transfer switch common member 10 terminal 10-1 and open direction limit switch 5. Latching relay 29 contacts 29-1 will close in order to continue energization of open direction coil 9 when first transfer switch common member 10 moves from terminal 10-1 to 10-2 as the door starts moving in the open direction Door opening contacts 9-1, 9-2 & 9-3 have now closed as explained in the preceding paragraphs and shown in FIG. 1 and the door will start moving towards the open position. Partial open relay 26 third set of normally closed contacts 26-3 will open to prevent energization of close control relay coil 6 and close coil 7 if close button 8 is depressed after close limit switch 15 closes its contacts when the door starts moving towards the open position. It should be noted that since open control relay 2 has not been energized in the partial open mode of operation its contacts 2-2 have not opened. As the door moves towards the open position, close limit switch 15 will close its contacts, then first transfer switch common member 10 will move its contact from terminals 10-1 to 10-2. When the door reaches the desired open position on-off time delay switch 30, which has been adjusted for the time of door travel to reach that point, will turn off de-energizing partial open relay coil 26, then contacts 26-1 will open re-setting on-off time delay switch by disconnecting it from the power source, contact 26-2 will trasfer, de-energizing door opening relay coil 9 which will open its contacts 9-1, 9-2 & 9-3 disconnecting the motor from the power source, as shown in FIG. 1, stopping the upward travel of the door and contact 26-3 will return to its normally closed position. The door is now ready to function in its normal manner from any door controlling button or switch.

The door activating and control apparatus of the invention has been shown by the above to perform all door operating functions in an improved and reliable manner and the above described embodiments are merely illustrative of the principles of the invention. Numerous modifications and adaptations thereof will readily be apparent to those skilled in the art without deparating from the spirit and scope of the present invention.

I now claim:

1. In combination in door activating and control apparatus, a power source, a normally closed stop button, a normally open door opening direction button, an open direction control relay coil and a normally closed open direction limit switch all serially connected, an off-on AC time delay switch consisting of a rectifier and resistor-capacitor network, serially connected to an open direction relay coil, said time delay switch and said open direction relay coil both connected in parallel to said open direction control relay coil, said time delay switch to delay energization of said open direction relay coil approximately one second after said open direction control relay coil has been energized, said open direction control relay first set of normally open self-latching contacts connected in parallel with said door opening direction button, said open direction control relay second set of normally closed contacts, a normally open door closing direction button, a close direction control relay coil and a normally closed close direction limit switch all serially connected, said close direction control relay normally open self-latching contacts connected in parallel with said close direction button, a close direction relay coil connected in parallel with said close direction control relay coil, said open direction control relay second set of normally closed contacts will open when said open direction control relay coil is energized to prevent said close direction control relay coil and said close direction relay coil from becoming energized if said close direction button is activated, a first transfer switch means having a common member and first and second terminals, said common member connected to said open direction button and said open direction control relay coil, said transfer switch first normally open terminal, which is held closed when the door is in the fully closed position, connected to said open direction relay coil to selectively energize said open direction relay coil by providing an electrical path to circumvent said off-on time delay switch when the door is in the fully closed position, said open direction relay one set of normally open self-latching contacts connected in parallel with said first transfer switch normally open terminal in order to continue energization of said open direction relay coil when said first transfer switch normally open terminal returns to its normally open position as the door starts to move towards its open position, a normally open safety edge sensor switch means connected to said first transfer switch second normally closed terminal placing said safety edge sensor switch in parallel with said open direction button and in series with said open direction control relay coil and said normally closed open direction limit switch, said first transfer switch to selectively defeat said safety edge sensor switch when the door is in the near closed position at which time said first transfer switch normally closed terminal is held open.

2. A combination as in claim 1, further comprising a second transfer switch means having a common member and first and second terminals a normally open button connected to said second transfer switch common member, said second transfer switch first normally closed terminal connected to said open direction button and said second transfer switch second normally open terminal connected to said close direction button in order to selectively connect said single button in parallel with said open direction button when the door is closed and said close direction button when the door is open.

3. A combination as in claim 1, further comprising a normally open partial door opening button, a partial open direction relay coil, an on-off AC time delay switch consisting of a rectifier, resistor-capacitor network and said normally closed open direction limit switch all serially connected, said on-off time delay switch will immediately energize said partial open relay coil when said partial open button is depressed, then return to its non-conducting state and de-energize said partial open direction relay coil when preadjusted time delay period expires, said partial open relay first set of normally open self-latching contacts connected in parallel with said partial open button, said partial open relay second set of contacts consisting of a common member a normally open terminal and a normally closed terminal, said common member connected to said first transfer switch common member, said normally open terminal serially connected to said stop button and said power source, said normally closed terminal, said open direction control relay coil and said normally closed open direction limit switch all serially connected, said partial open relay second set of contacts, when activated, will energize said door opening relay coil and prevent said door opening control relay coil from becoming energized, said partial open relay third set of normally closed contacts serially connected to said close direction control relay coil and said normally closed close direction limit switch, in order to prevent said close direction relay coil and said close direction control relay coil from becoming energized if said close direction button is depressed when the door is traveling towards the open position.

4. A combination as in claim 1, wherein said door opening relay one set of normally open contacts connected in parallel with said first transfer switch normally open terminal is replaced with a latching relay coil connected in parallel with said door opening direction relay coil, said latching relay one set of normally open contacts connected in parallel with said first transfer switch normally open terminal in order to continue energization of said open direction relay coil and said latching relay coil when said first transfer switch first normally open terminal, held closed when the door is in the closed position, returns to its normally open position when the door starts to move towards its open position.

* * * * *